United States Patent [19]

Nakajima et al.

[11] Patent Number: 4,574,923
[45] Date of Patent: Mar. 11, 1986

[54] FLOATING DISK BRAKE

[75] Inventors: Shiro Nakajima; Koki Fukudome, both of Hyogo, Japan

[73] Assignee: Sumitomo Electric Industries, Inc., Osaka, Japan

[21] Appl. No.: 645,929

[22] Filed: Aug. 30, 1984

[51] Int. Cl.$^4$ ............................................. F16D 65/14
[52] U.S. Cl. .................................. 188/73.45; 188/344
[58] Field of Search ............... 188/73.45, 73.44, 18 A, 188/344, 24.11, 24.22, 205 R, 73.32, 73.39

[56] References Cited

U.S. PATENT DOCUMENTS

| | | | |
|---|---|---|---|
| 4,022,297 | 5/1977 | Haraikawa | 188/344 X |
| 4,039,053 | 8/1977 | Meyer et al. | 188/73.45 |
| 4,369,862 | 1/1983 | Seki | 188/73.45 |

Primary Examiner—Douglas C. Butler
Attorney, Agent, or Firm—Ernest A. Beutler

[57] ABSTRACT

A floating disk brake of small weight and low manufacturing cost in which the caliper slides stably and the center of gravity of the caliper is set close to the front fork or the like where it is supported. Torque receiving surfaces formed on both sides of a caliper are arranged such that side surfaces of the backing plates of the pads are abutted thereagainst. A pin which supports the pads on both sides of the disk rotor is provided in the caliper, extending parallel to the rotary axis of the disk rotor and inserted into central portions of peripheries of the backing plates. Two slide bolts for slidably supporting the caliper have first end portions screwed into a member which is rigid with the body or frame of the vehicle and second end portions slidably inserted into respective sides of the caliper. At least one of the slide bolts is arranged so as to partially overlie the disk rotor with a slide center of that slide bolt being substantially coincident with the center of the thickness of the disk rotor.

5 Claims, 4 Drawing Figures

FLOATING DISK BRAKE

BACKGROUND OF THE INVENTION

The present invention relates to a floating disk brake suitable for braking a two-wheeled vehicle.

In general, two types of disk brakes are available for two-wheeled vehicles. In one of these types, a floating caliper is supported by a fixing member which is mounted on a member of the vehicle body such as a front fork. In the other type of disk brake, a torque receiving part is formed integrally with the front fork, and the caliper is slid in the axial direction of the disk rotor as the pads wear.

The former type of disk brake is disadvantageous in that, as the disk brake requires the fixing member, it is relatively heavy. Also, since the fixing member is disposed between the caliper and the front fork, the center of gravity of the caliper is offset from the fork center, and hence its inertial moment relative to the fork is large, which lowers the handling characteristics of the motorbike.

The latter disk brake type, although superior to the above-described disk brake in performance, suffers from the difficulty that the torque receiving part lying over the disk rotor must be formed on the front fork so as to extend therefrom. Thus, the structure of the front fork is intricate and the manufacturing cost thereof is high. Furthermore, in the other type of disk brake, it is difficult to make the right and left pads of the same configuration. Therefore, because the pads cannot be interchanged, they are more expensive.

SUMMARY OF THE INVENTION

Accordingly, an object of the invention is to provide a floating disk brake of small weight and low manufacturing cost and in which the caliper slides stably and the center of gravity of the caliper is close to the front fork or the like.

In order to achieve the foregoing object, in the floating disk brake according to the invention, a brake force applied to the pads is first recieved by the caliper and then transmitted to the vehicle body through two slide bolts serving also as caliper mounting bolts. At least one of the bolts extends over the disk rotor in such a manner that the slide center thereof is substantially coincident with the center of the disk rotor.

DESCRIPTION OF THE PREFERRED EMBODIMENTS

A preferred embodiment of the invention will be described with reference to the accompanying drawings.

Figure 1:
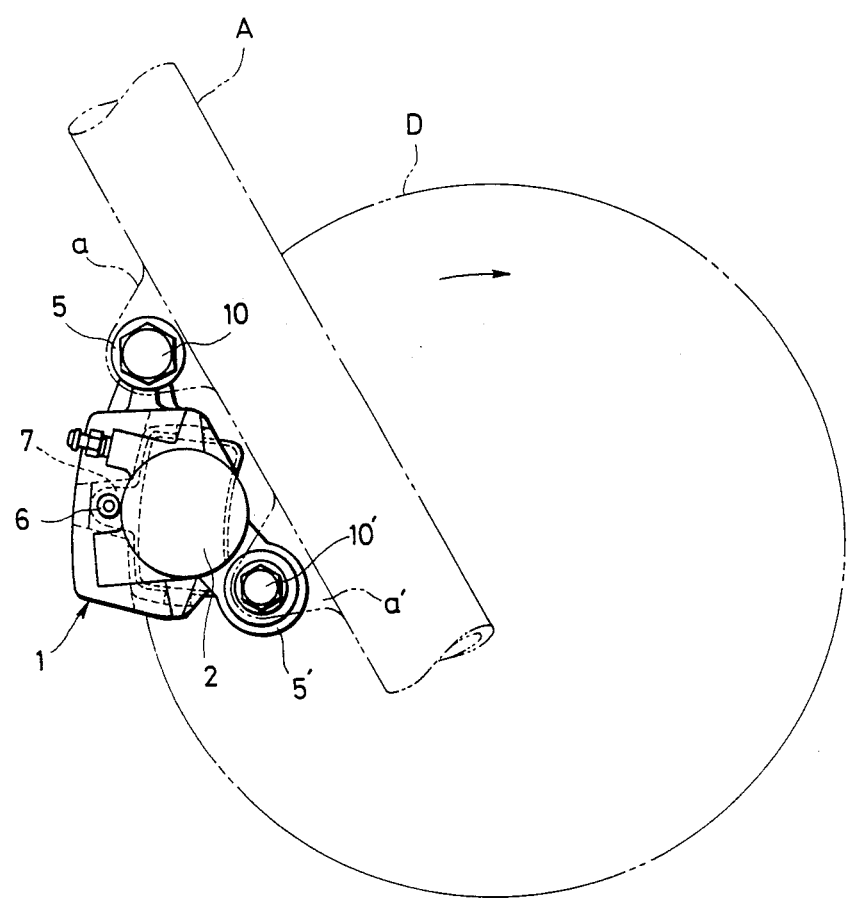
FIGS. 1. 2 and 3 are a front view, a left side view, and a bottom view showing an example of a disk brake according to the invention.
Figure 2:
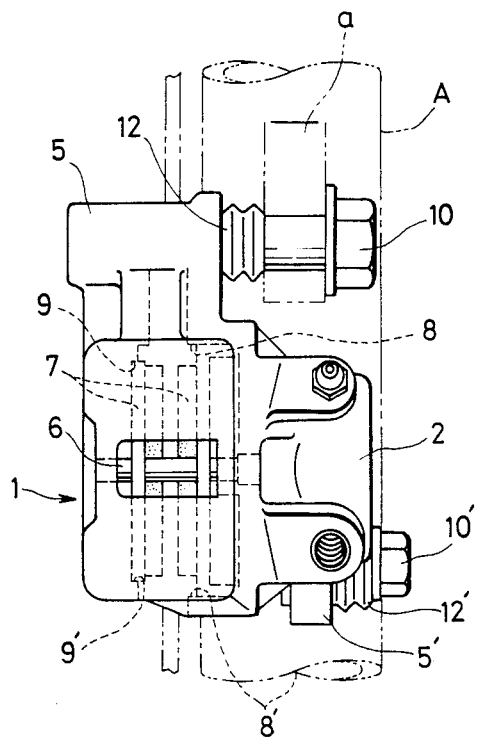
Figure 3:
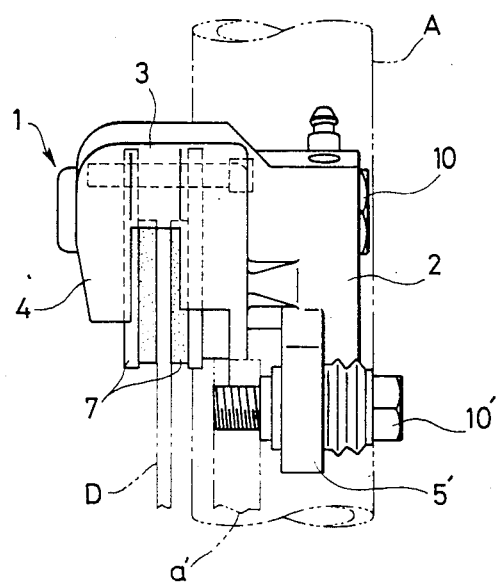

In FIGS. 1 through 3, reference numeral 1 designates a caliper which includes, as one unit, a cylinder part 2, a bridge part 3, an outer leg 4 and slide parts 5 and 5' into which slide bolts (described later) are inserted. A liquid-pressure-operated piston (not shown) is mounted in the cylinder part 3. The bridge part of the caliper has a pin 6 at the center. The pin 6 is laid parallel to the axis of rotation of a disk rotor D and passes through apertures in protrusions which extend from the peripheries of the backing plates of a pair of pads 7 which are disposed on both sides of the disk rotor. That is, the pin 6 prevents the pads 7 from coming off the caliper. As shown in FIG. 2, torque receiving surfaces 8, 8' and 9, 9' are formed in the caliper on both sides corresponding to the inner and the outer sides of the disk rotor and are abutted against the side surfaces of respective ones of the pads 7. Specifically, the surfaces 8 and 9 receive the brake torque which is applied to the pads when the vehicle moves forwardly and the surfaces 8' and 9' receive the brake torque which is applied to the pads when the vehicle moves backwardly.

Figure 4:
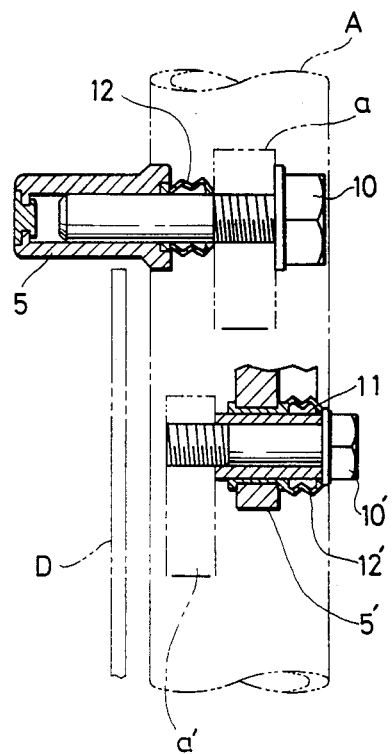
FIG. 4 is a sectional view showing slide parts of a caliper.

Of the slide parts of the caliper, the slide part 5 positioned on the outer side of the rotor D is adjacent the periphery of the rotor, and the other slide part 5' positioned on the inner side of the rotor D is provided on one side of the rotor and extends in the axial direction of the rotor D. As shown in FIG. 4, a slide bolt 10, which receives the main portion of the torque, is fitted into the hole of the slide part 5 so that the slide part 5 is slidable with respect to the slide bolt 10. Another slide bolt 10', which receives the remaining part of the torque, is fitted into the hole of the slide part 5' in the same manner.

The above-described slide bolts 10 and 10' serve also for mounting the caliper on the vehicle. The bolts 10 and 10' are screwed into mounting parts a and a' formed on a member A of the vehicle body such as the front fork. One end portion of the bolt 10 inserted into the slide part 5 extends over the rotor in such a manner that the center of the effective sliding length or bearing area of the slide part 5 with the bolt coincides with the center of the thickness of the rotor.

The slide bolt 10' is preferably a stepped bolt. However, in the case where it is a straight bolt as shown in FIG. 4, a sleeve 11 should be placed over the bolt so as to provide a sufficiently tight fit. In this connection, the slide part 5 may be shifted radially of the rotor so that the bolt 10' extends over the rotor. However, it should be noted that, in this case, it is necessary to greatly protrude the mounting part a' of the member of the vehicle body. Accordingly, it is preferable that the slide part and the pin be designed as shown in FIG. 4.

In the figures, references numerals 12 and 12' designate dust boots.

In the disk brake thus constructed, the brake torque which acts on the pads 7 is received by the torque receiving surfaces 8 and 9 or 8' and 9' and transmitted to the caliper. The brake torque thus transmitted is received by the two slide bolts which are fixedly secured to the vehicle body.

As described above, in the disk brake according to the invention, the two slide bolts serve also as the mounting bolts of the caliper, and a brake force applied to the pads is transmitted through the caliper to these bolts. No fixing member as used in the conventional floating disk brake is needed. Accordingly, the disk brake of the invention is smaller in weight and lower in manufacturing cost than the conventional floating disk brake.

The mounting parts formed on the member of the vehicle body are simple in configuration. The member can be readily manufactured at low cost.

In the inventive disk brake, the center of the effective slide length of at least one of the slide bolts is substantially coincident with the center of the thickness of the rotor, and therefore the caliper will not be twisted during braking. Accordingly, the caliper operates smoothly to permit a stable braking operation. In addition, decreases of the brake force due to inadequate contact of the pads is eliminated, and nonuniform wear of the lining members reduced.

Furthermore, since the disk brake has no fixing member, the center of gravity of the caliper may be set close to the front fork, for instance, so that the inertial moment relative to the front fork is decreased, whereby the handling characteristics are improved.

We claim:

1. A floating disk brake for a vehicle having a brake rotor supported for rotation about an axis comprising a pair of brake pads, said brake pads each having a backing plate, a caliper, said caliper having torque receiving surfaces formed on both sides thereof corresponding to inner and outer sides of the brake rotor, side surfaces of said backing plates of said pad abutting against said torque receiving surfaces, and two slide bolts for slidably supporting said caliper from the associated vehicle body, said slide bolts having first end portions fixed relative to a member integral with the vehicle body and having cantilevered second end portions slidably inserted into respective bearing surfaces of said caliper, at least one of said bolts and the respective bearing surface of said caliper lying over said brake rotor with the center of engagement of the respective bearing surface of said caliper and said one of said slide bolts being substantially coincident with the center of said brake rotor in an axial direction.

2. The floating disk brake of claim 1, wherein another of said slide bolts is arranged adjacent an inner surface of said disk rotor.

3. The floating disk brake of claim 2, wherein said other of said slide bolts is a stepped bolt.

4. The floating disk brake of claim 2, wherein said other of said slide bolts is a straight bolt having a sleeve fitted around a slide surface thereof.

5. The floating disk brake of claim 1, further comprising dust boots fitted around the exposed portion of each of said slide bolts.

* * * * *

UNITED STATES PATENT AND TRADEMARK OFFICE
CERTIFICATE OF CORRECTION

PATENT NO. : 4,574,923

DATED : March 11, 1986

INVENTOR(S) : Shiro Nakajima et al

It is certified that error appears in the above-identified patent and that said Letters Patent is hereby corrected as shown below:

Column 1, line 42, "recieved" should be --received--.

Column 1, line 66, delete "3"

Column 1, line 66, following "bridge part" insert --3--.

Column 3, line 18, Claim 1, "pad" should be --pads--.

Column 4, line 4, Claim 1, following "said" insert --slide--.

Signed and Sealed this

Seventh Day of October, 1986

[SEAL]

Attest:

DONALD J. QUIGG

Attesting Officer

Commissioner of Patents and Trademarks